Jan. 2, 1940.   L. TVEIDT   2,185,779
ADJUSTABLE STEERING POST
Filed Oct. 13, 1937   2 Sheets-Sheet 1
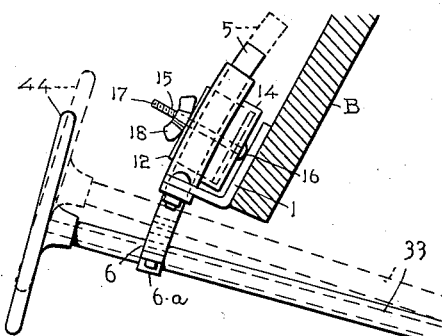
FIG. 1.
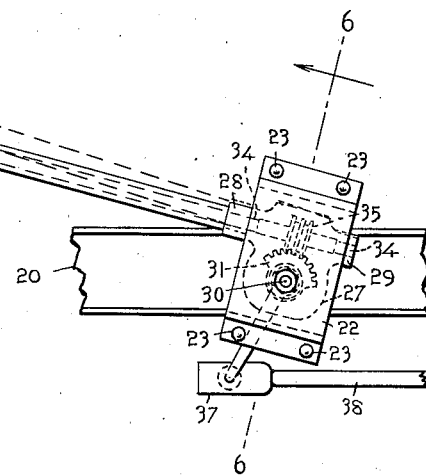
FIG. 3.
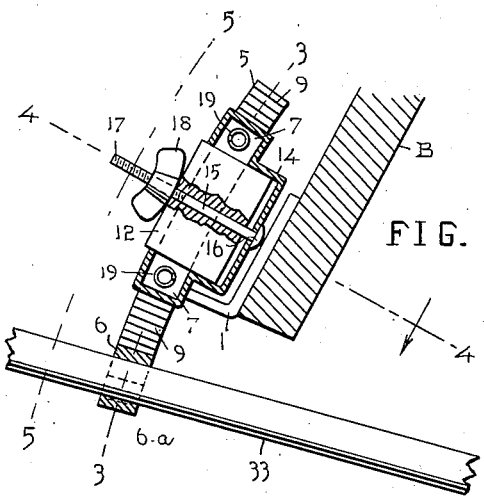
FIG. 2.
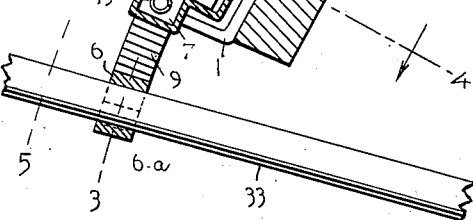
FIG. 4.
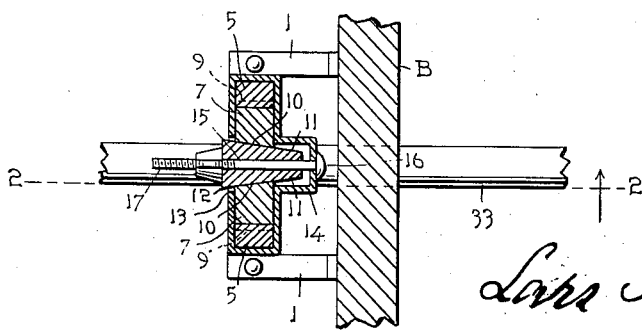
Lars Tveidt Inventor
By Ogle R. Singleton
Attorney Jan. 2, 1940.   L. TVEIDT   2,185,779
ADJUSTABLE STEERING POST
Filed Oct. 13, 1937   2 Sheets-Sheet 2

Lars Tveidt  Inventor

By Ogle R. Singleton
Attorney

Patented Jan. 2, 1940

2,185,779

UNITED STATES PATENT OFFICE 2,185,779

ADJUSTABLE STEERING POST

Lars Tveidt, Pasadena, Calif.

Application October 13, 1937, Serial No. 168,806

3 Claims. (Cl. 74—493)

My invention consists in a new and useful improvement in adjustable steering posts for automobiles and is designed to provide a device for steering an automobile which can be easily and quickly adjusted, in order to position the steering wheel at the proper height relative to the driver's seat to accommodate the particular driver of the car. The particularly novel and useful features of my device are the means which I provide to mount adjustably both ends of the steering rod. In my device the lower end of the rod, provided with the standard mechanisms for controlling the front wheels of the car, is pivotally mounted by means of a novel mount comprising bearings carried by the car chassis and a housing pivoted therein for carrying the steering mechanism, and the upper end of the steering rod, having the standard steering post and steering wheel, is provided with a novel form of supporting means whereby the steering rod is related adjustably to the body of the car. My improved device is designed so that the steering rod can operate either directly upon the steering knuckle of one front wheel and through it upon the steering knuckle of the other front wheel, or directly upon both steering knuckles.

While I have illustrated in the drawings and have hereinafter fully described two specific embodiments of my improved device, it is to be distinctly understood that I do not consider my invention limited to said specific embodiments, but refer for its scope to the claims appended hereto.

In the drawings:

Fig. 1 is a side elevation of my improved device installed in operative position.

Fig. 2 is a vertical section on the line 2—2 of Fig. 4.

Fig. 3 is a vertical section of the supporting means on the line 3—3 of Fig. 2.

Fig. 4 is a horizontal section on the line 4—4 of Fig. 2.

Figure 5:
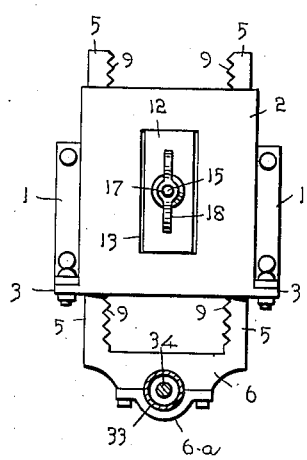
Fig. 5 is a front elevation of the supporting means on the line 5—5 of Fig. 2.
Figure 6:
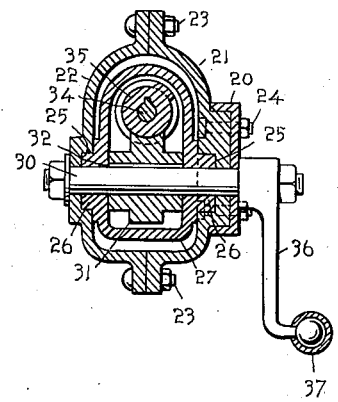
Fig. 6 is a vertical section on the line 6—6 of Fig. 1.
Figure 7:
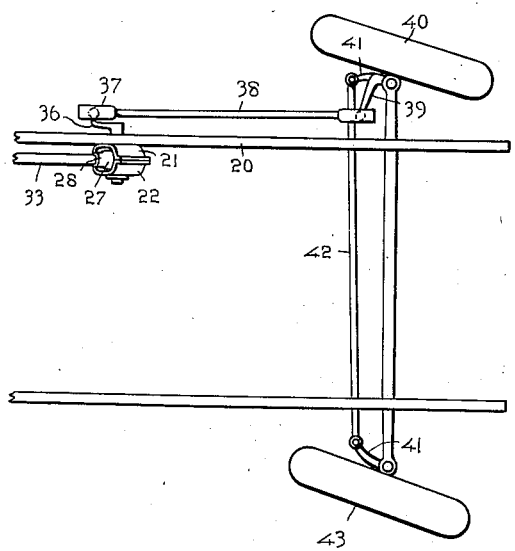
Fig. 7 is a top plan view showing the mechanism connecting the steering rod and the steering knuckles of the front wheels.

As illustrated in the drawings, my device has a pair of L-shaped brackets 1 bolted to the lower edge of the instrument board B. A housing 2 is bolted to these brackets 1 by means of wings 3 thereon. The housing 2 is provided in its top and bottom with openings 4 through which pass the arms 5 of a U-shaped hanger 6 received through the housing 2. Carried in the housing 2 are the sliding locking members 7 so disposed that when they are moved apart their teeth 8 interlock with the teeth 9 on the arms 5. The members 7 are provided with inner convergent faces 10 with which co-act the divergent faces 11 of the wedge 12 disposed between the members 7 and extended forwardly through an opening 13 in the front of the housing 2, and rearwardly into a suitable well 14 at the rear of the housing 2. An adjusting bolt 15 passed loosely through the wedge 12 has its head 16 bearing against the rear face of the housing 2 and its threaded end 17 provided with a wing nut 18 bearing against the wedge 12. I provided contraction springs 19 attached to the members 7 to cause them to move toward each other when relieved from the pressure of the wedge 12.

Suitably mounted upon one of the side beams 20 of the chassis, I provide a housing consisting of the co-acting members 21 and 22 attached to each other by bolts 23, the member 21 being attached to the beam 20 by bolts 24. The members 21 and 22 are provided with aligned bearing 25 in which are journaled trunnions 26 of a housing 27 disposed within the outer housing formed by the members 21 and 22, and having two aligned extensions 28 and 29 extending outside of the said outer housing. I provide a rock shaft 30 journaled in the members 21 and 22, and passing through the trunnions 26, housing 27 and beam 20, and having mounted thereon a mutilated pinion 31 by a key 32, within the housing 27. Suitably mounted in the extension 28 of the housing 27 is the lower end of the tubular sleeve 33 for the steering rod 34 journaled in the extension 29. The sleeve 33 has its upper end carried on the bottom of the hanger 6 by the stirrup 6—a bolted to the hanger 6.

Mounted on the steering rod 34 and suitably disposed in the housing 27 there is the worm 35 meshing with the pinion 31. Carried by the rock shaft 30 is the crank-arm 36 having the ball-and-socket connection 37 with the link 38 connected with the steering knuckle 39 of the left front wheel 40 of the automobile having the crank arms 41 and link 42 to connect it with the right front wheel 43.

The steering rod 34 has the ordinary steering wheel 44 rotatably mounted on the sleeve 33.

Figure 8:
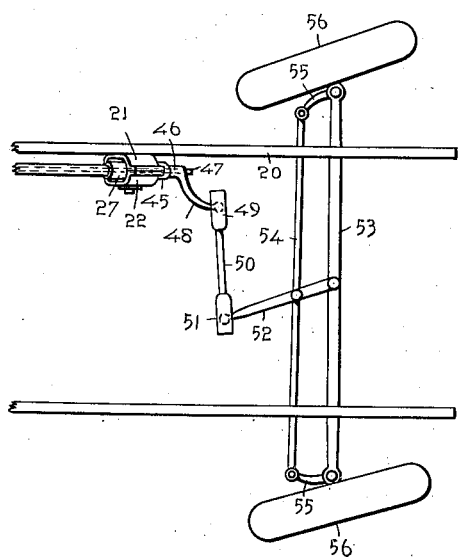
Fig. 8 is a view similar to Fig. 7 but showing a modified form of connecting means between the steering rod and the steering knuckles.

In the modified form of my device, illustrated in Fig. 8, the extension 45 on the forward side of the housing 27 is designed to form a journal for the steering rod 46 and allow the outer end 47 of the steering rod 46 to pass outwardly so that its crank-arm 48 has the ball-and-socket connection 49 with the link 50 connected by ball-and-socket connection 51 with the lever 52 pivoted on the axle 53. I provide a link 54 pivotally attached to the lever 52 and each of the crank-arms 55 for the front wheels 56.

From the foregoing description of the details of construction of my device, its use and operation will be obvious. By loosening the wing nut 18, the members 7 will be released from pressure by the wedge 12 and will be so drawn together by the springs 19 that the teeth 8 will be withdrawn from contact with the teeth 9 of the arms 5 of the hanger 6. The wheel 44 may then be adjusted to the desired position, the hanger 6 moving in the housing 2, and the housing 27 in which the lower end of the steering rod 34 is journaled, rocking on its trunnions 26 in the bearings 25. When the wheel 44 has been properly positioned, the wing nut 18 is tightened, expanding the elements 7 by the wedge 12 and causing the teeth 8 to interlock with the teeth 9 and fasten the hanger 6 in relation to the fixed housing 2, thereby firmly supporting the steering post and the wheel 44 in desired position.

Having described my invention, what I claim is:

1. In an adjustable steering post, the combination of a housing adapted to be mounted on the instrument board of an automobile; a pair of arms slidable through said housing and provided with means for connection to a steering post pivotally mounted on the chassis of an automobile; a pair of blocks slidably mounted in said housing; wedge means interposed between said blocks and adapted to force said blocks into clamping engagement with said arms to prevent movement of said arms relative to said housing.

2. In an adjustable steering post, the combination of a housing adapted to be bolted to an automobile chassis, and having two aligned bearings; a second housing provided with hollow trunnions journaled in said bearings, and having two aligned bearings transversely disposed relative to said trunnions; a rock shaft journaled in said trunnions and having a crank for connection with the steering knuckles of the forward wheels of the automobile; and a steering rod journaled in the bearings of the second housing and provided with means adapted to rock said shaft.

3. In an adjustable steering post, the combination of a housing adapted to be bolted to an automobile chassis, and having two aligned bearings; a second housing provided with hollow trunnions journaled in said bearings, and having two extensions projecting outside said first housing; a rock shaft journaled in said trunnions and having a crank for connection with the steering knuckles of the forward wheels of the automobile; and a steering rod journaled in the extensions of the second housing and provided with means adapted to rock said shaft.

LARS TVEIDT.